Jan. 2, 1951    H. S. GLEASON    2,536,803
MOTION TRANSMITTING MEANS
Filed Nov. 14, 1949
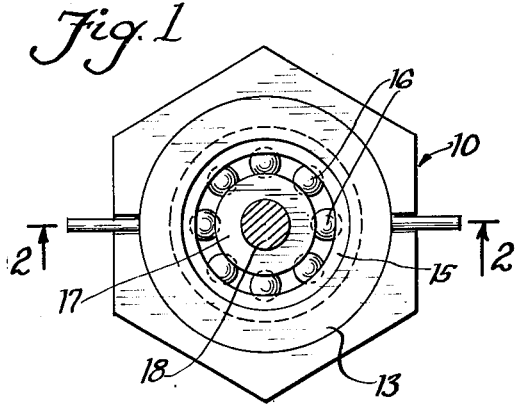
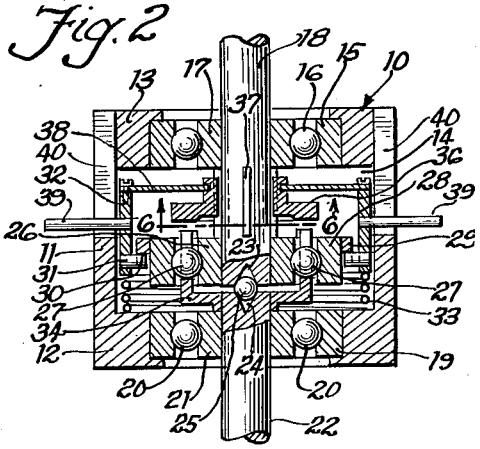
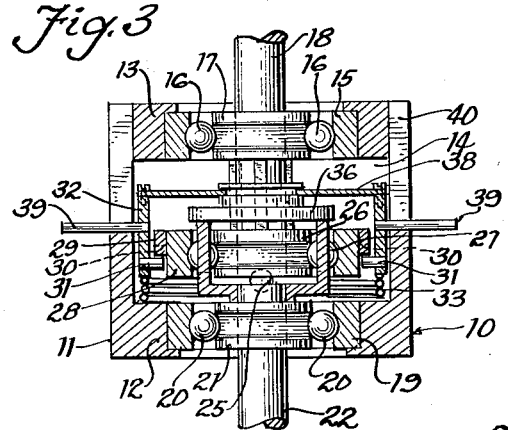
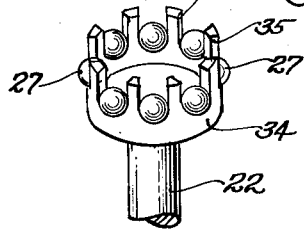
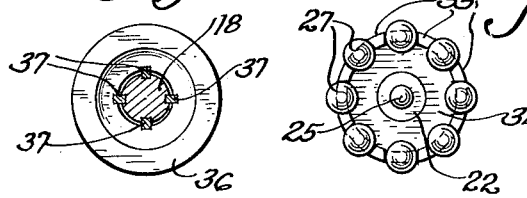
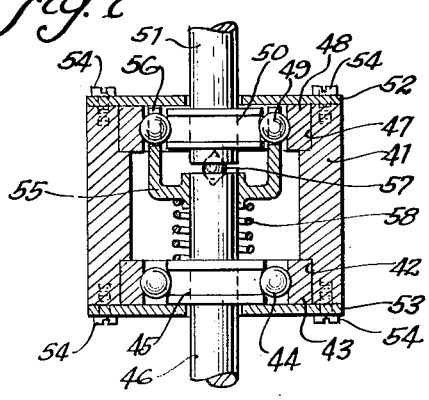
INVENTOR.
Howard S. Gleason
BY T. L. Bowes
Att'y Patented Jan. 2, 1951

2,536,803

UNITED STATES PATENT OFFICE 2,536,803

MOTION TRANSMITTING MEANS

Howard S. Gleason, Rochester, N. Y., assignor to Stromberg-Carlson Company, a corporation of New York Application November 14, 1949, Serial No. 127,133

3 Claims. (Cl. 74—772)

This invention relates to anti-friction motion transmitting means, more particularly to speed changing mechanism employing anti-friction driving elements, which mechanism is adjustable selectively to provide either a predetermined speed change or a direct one-to-one ratio drive, and the invention has for an object the provision of improved motion transmitting means of this character.

Various types of apparatus are in use today wherein it is necessary, or at least highly desirable, to employ speed reducing or speed changing mechanism which is capable of effecting the desired speed change without introducing objectionable vibration or flutter into the system, and it has been found that gear type reducers, even though of the finest precision construction, are not entirely satisfactory from this standpoint. Furthermore, it is desirable in many types of apparatus to be able to change speeds easily and smoothly, and accordingly it is a further object of this invention to provide a smoothly operating, positive acting, motion transmitting or speed changing unit which employs no gears, which is compact and economical to construct, and which may be readily adjusted to change speeds.

In carrying out the invention in one form, an anti-friction motion transmitting unit is provided comprising driving and driven shafts having an inner race mounted on one of the shafts, an outer race surrounding the inner race, and a plurality of anti-friction elements disposed between the inner and outer races, together with a retainer member mounted on the other one of the shafts and including spaced fingers extending axially between the races for engaging the anti-friction elements in driving relation, thrust means being provided for exerting sufficient pressure between the races and the anti-friction elements to prevent slippage of the anti-friction elements relative to the races. In the form of the invention wherein speed changing means are provided, an adjustable control member is arranged for movement between two positions and provided with means effective in one of the positions for locking the outer race against rotation, and clutch means are provided connected in driving relation to the shaft carrying the inner race and adapted to be moved by the control member into engagement with the retainer fingers so that movement of the control member is effective through the clutch to provide a direct driving connection between the shafts while at the same time releasing the outer race for free rotation.

For a more complete understanding of the invention reference should now be had to the drawing, in which:

Fig. 1 is a top plan view of a motion transmitting unit embodying the invention, as applied to vertically extending driving and driven shafts;

Fig. 2 is a sectional elevational view taken substantially along the line 2—2 of Fig. 1, with the unit adjusted to provide a speed reduction between the driving and driven shafts;

Fig. 3 is a sectional elevational view similar to Fig. 2 but with certain of the parts shown in elevation, showing the unit adjusted for a direct one-to-one ratio drive between the shafts;

Fig. 4 is a detailed perspective view showing the retainer element embodied in the unit of Figs. 1 to 3, inclusive;

Fig. 5 is a top plan view of the retainer member shown in Fig. 4;

Fig. 6 is a detailed sectional view taken substantially along the line 6—6 of Fig. 2; and Fig. 7 is an elevational sectional view similar to Fig. 2 but showing a simplified embodiment of the invention wherein the ratio adjusting means is omitted.

Referring first to Figs. 1 to 6 of the drawing, the invention is shown as embodied in a motion transmitting unit comprising a housing 10 having side walls 11, a bottom wall 12, and a top wall 13, which define an internal substantially cylindrical chamber 14 within which the motion transmitting mechanism is housed. While the housing 10 has been shown in Fig. 1 as being substantially hexagonal in cross section, it will, of course, be understood that the housing may be of any desired shape and that the chamber 14 therewithin may also be shaped as desired.

Supported by the top wall 13 in a suitable aperture therethrough is an anti-friction bearing comprising an outer race 15 which is secured in the top wall 13, preferably by a force fit, a plurality of anti-friction elements or ball bearings 16 and an inner race 17, the inner race of the bearing being suitably secured to a shaft 18, which may constitute the driving shaft of the unit. Similarly supported in the bottom wall 12 of the housing is an anti-friction bearing comprising an outer race 19, a plurality of anti-friction elements or ball bearings 20, and an inner race 21, the inner race being suitably secured, as, for example, by a force fit, to a shaft 22 which may constitute the driven shaft of the unit and which, as shown, is disposed in aligned end-to-end relation with respect to the driving shaft 18, the shafts being respectively provided with conical notches 23 and 24 in the respective ends thereof for receiving a thrust bearing 25, which is shown as constituting a ball bearing.

In order to effect driving of the shaft 22 from the shaft 18 at a predetermined reduced speed, the driving shaft 18 is provided, as shown, with an inner race 26 suitably secured thereto, which inner race is adapted to be engaged by a plurality of anti-friction elements or ball bearings 27, which in turn engage an outer race 28 which surrounds the inner race 26 and the ball bearings 27. Secured to the outer race 28 is an annular peripheral flange 29 which is provided at opposite sides with suitable notches 30 for receiving a pair of positioning pins 31 carried by a control member or collar 32. As shown, a suitable thrust spring 33 is provided, the lower end of which bears against the bottom wall 12 of the housing 10 and the upper end of which bears against the lower edge of the control member or collar 32 so as to exert through the positioning pins 31 and the annular flange 29 an upward thrust on the outer race 28 of sufficient magnitude to insure that a sufficiently large pressure is exerted between the races 26 and 28 and the ball bearings 27 to prevent slippage of the ball bearings 27 relative to the races under loads of the magnitude for which the unit is designed.

Secured to the upper end of the driven shaft 22 is a cup-shaped ball retainer member 34 having a plurality of upwardly extending spaced fingers 35 which extend axially between and beyond the races 26 and 28 so as to engage the ball bearings 27 in driving relationship.

As will be apparent to those skilled in the art, rotation of the driving shaft 18, with the unit arranged as thus far described, will effect planetary movement of the ball bearings 27 about the inner race 26 so as to drive the shaft 22 through the retainer member 34 at a reduced speed. Due to the entire absence of gears and to the action of the thrust spring 33 in preventing slippage of the ball bearings 27, a smooth and positive drive will be obtained at the reduced speed determined by the relative dimensions of the races 26 and 28 and the ball bearings 27.

In order to adjust the unit for driving of the shaft 22 at a one-to-one ratio with respect to the driving shaft 18, the unit is provided, as shown in Fig. 2, with a clutch plate 36 which is mounted on the driving shaft 18 and secured thereto by suitable splines or pins 37 in axially slidable but non-rotatable relation with respect to the shaft. Extending outwardly from the upper end of the clutch plate 36 is a pair of supporting arms 38, the outer ends of which are suitably connected to the control member or collar 32 so that axial movement of the collar 32 is effective to cause a similar movement of the clutch plate 36.

Operation of the clutch plate 36 and the collar 32, which are normally maintained in the position shown in Fig. 2 by the thrust spring 33, may be effected by means of a pair of pins 39 which extend outwardly from the collar 32 through suitable slots 40 formed in the side walls 11 of the housing 10. By pressing the pins 39 downwardly from the position shown in Fig. 2 to the position shown in Fig. 3, the clutch plate 36 may be brought into driving engagement with the extending ends of the fingers 35 on the retainer member 34 and at the same time the locking pins 31 carried by the collar 32 will be moved out of the slots 30 in the flange 29 on the outer race 26 so as to release the outer race for free rotation. With the unit in this adjusted position, rotation of the shaft 18 is effective to drive the shaft 22 directly through the clutch plate 36 and the retainer member 34 so as to provide a one-to-one driving relation, and it will be observed that the change from the speed reducing operation of Fig. 2 to the direct drive relation of Fig. 3 may be accomplished smoothly without clashing or meshing of gears and without the necessity of delicate or complicated adjustments.

In the embodiment of the invention shown in Fig. 7 in which no means is provided for adjusting the relative speed between the driving and driven shafts, a suitable substantially cylindrical housing 41 is provided which is formed adjacent its lower end with a suitable recess 42 for receiving the outer race 43 of a ball bearing structure, which likewise includes a plurality of anti-friction elements or ball bearings 44 and an inner race 45, which inner race is frictionally mounted on a shaft 46 which may be considered the driven shaft of the unit. Likewise the housing 41 is provided adjacent its upper end with a recess 47 for receiving the outer race 48 of a ball bearing structure, which likewise includes a plurality of ball bearings 49 and an inner race 50, the inner race 50 being secured to a shaft 51 which may be considered the driving shaft. The opposed bearing structures may be secured in the housing 41 in any suitable manner, as, for example, by top and bottom cover plates 52 and 53 secured to the housing by suitable screws 54.

In this embodiment of the invention, the shaft 46 is provided with a cup-shaped retainer member 55 of substantially the construction illustrated in connection with the previously disclosed embodiment, which retainer member includes spaced apart fingers 56 adapted to extend between the inner and outer races 50 and 48 so as drivingly to engage the ball bearings 49. The shafts 46 and 51 in this embodiment of the invention are likewise provided with suitable conical notches in the end thereof for receiving an end thrust bearing 57, and a thrust spring 58 is provided having one end adapted to engage the inner race 45 and the upper end adapted to engage the retainer member 55 so as to exert through the ball bearings 49 a sufficient pressure between the inner and outer races 50 and 48 to prevent slippage of the ball bearings relative thereto. The operation of the embodiment described in Fig. 7 is similar to the speed reducing operation of the previously described embodiment in that rotation of the shaft 51, for example, is effective by reason of the planetary movement of the ball bearings 49 to drive the shaft 46 at a reduced speed through the retainer member 55, the speed reduction being dependent upon the relative dimensions of the inner and outer races 50 and 48 and the ball bearings 49.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed and desired to be secured by Letters Patent is:

1. Anti-friction motion transmitting means comprising driving and driven shafts disposed in coaxial end-to-end relation, an inner race mounted on said driving shaft, an outer race surrounding said inner race, a control member movable between a first position and a second position and including means engageable in said first position with said outer race to lock said outer race against rotation, a plurality of anti-friction elements disposed between said races, a retainer member on said driven shaft including spaced fingers extending axially between and beyond said races for engaging said anti-friction elements whereby said driven shaft is rotated at a reduced speed upon rotation of said driving shaft, clutch means connected in driving relation to said driving shaft and in spaced relation to the extending ends of said retainer fingers, and means connecting said clutch means to said control means for operating said clutch means into direct driving relation with said retainer by movement of said control member to said second position to release said outer race for rotation.

2. Anti-friction motion transmitting means comprising driving and driven shafts disposed in coaxial end-to-end relation, an inner race mounted on said driving shaft, an outer race surrounding said inner race, a control member movable between a first position and a second position and including means engageable in said first position with said outer race to lock said outer race against rotation, a plurality of anti-friction elements disposed between said races, a retainer member on said driven shaft including spaced fingers extending axially between and beyond said races for engaging said anti-friction elements whereby said driven shaft is rotated at a reduced speed upon rotation of said driving shaft, a clutch plate mounted on said driving shaft in slidable but non-rotatable relation thereto, and means connecting said clutch plate to said control member for movement into clutching engagement with the extending ends of said retainer fingers upon movement of said control member to said second position, said control member in said second position effecting release of said outer race for free rotation.

3. Anti-friction motion transmitting means comprising driving and driven shafts disposed in coaxial end-to-end relation, an inner race mounted on said driving shaft, an outer race surrounding said inner race, a control member movable between a first position and a second position and including means engageable in said first position with said outer race to lock said outer race against rotation, a plurality of anti-friction elements disposed between said races, resilient means urging said control member toward said first position and effective through said race engageable means to exert sufficient pressure between said races and elements to prevent slippage therebetween, a retainer member on said driven shaft including spaced fingers extending axially between and beyond said races for engaging said anti-friction elements whereby said driven shaft is rotated at a reduced speed upon rotation of said driving shaft, a clutch member mounted on said driving shaft in axially movable but non-rotatable relation thereto, and means connecting said clutch member to said control member for movement into clutching engagement with the extending end of said retainer fingers when said control member is moved toward said second position against the force of said resilient means, said control member in said second position effecting disengagement of said outer race for free rotation during direct driving of said driven shaft through said clutch member.

HOWARD S. GLEASON.

REFERENCES CITED

The following references are of record in the file of this patent:

UNITED STATES PATENTS

| Number | Name | Date |
|---|---|---|
| 1,201,367 | Shelton | Oct. 17, 1916 |
| 1,995,171 | De Tar | Mar. 19, 1935 |
| 2,188,087 | Proctor | Jan. 23, 1940 |
| 2,398,720 | Robinson | Apr. 16, 1946 |

FOREIGN PATENTS

| Number | Country | Date |
|---|---|---|
| 391,298 | France | Aug. 26, 1908 |